United States Patent [19]
Conn

[11] Patent Number: 5,865,338
[45] Date of Patent: Feb. 2, 1999

[54] METHOD FOR ADDING STRENGTH TO A CONTAINER

[75] Inventor: Wendell Conn, Polk, Ohio

[73] Assignee: Rubbermaid Incorporated, Wooster, Ohio

[21] Appl. No.: 823,211

[22] Filed: Mar. 24, 1997

[51] Int. Cl.⁶ .................................................. B65D 45/00
[52] U.S. Cl. .......................... 220/675; 220/623; 220/908
[58] Field of Search .................................... 220/623, 651, 220/669, 675, 908

[56] References Cited

U.S. PATENT DOCUMENTS

| | | | |
|---|---|---|---|
| D. 186,194 | 9/1959 | Beverlin | D58/4 |
| D. 231,184 | 4/1974 | Brown et al. | D12/2 |
| D. 233,127 | 10/1974 | Karn, Jr. | D7/194 |
| D. 246,566 | 12/1977 | Van Skiver | D7/194 |
| D. 253,932 | 1/1980 | Mockler | D7/194 |
| D. 260,229 | 8/1981 | Maza | D7/189 |
| D. 261,569 | 10/1981 | Darois | D34/39 |
| D. 261,720 | 11/1981 | Brazis | D34/9 |
| D. 271,248 | 11/1983 | Maza et al. | D34/8 |
| D. 277,898 | 3/1985 | Paul et al. | D34/11 |
| D. 280,459 | 9/1985 | McClelland | D34/8 |
| D. 280,857 | 10/1985 | Fuller | D37/11 |
| D. 293,843 | 1/1988 | Kroll et al. | D34/8 |
| D. 297,875 | 9/1988 | Carville | D34/11 |
| D. 308,273 | 5/1990 | Hanna | D34/11 |
| D. 308,742 | 6/1990 | Bulkens | D34/11 |
| D. 318,354 | 7/1991 | Delmerico | D34/7 |
| D. 319,128 | 8/1991 | Delmerico et al. | D34/11 |
| D. 319,905 | 9/1991 | Hotchkiss | D34/9 |
| D. 321,576 | 11/1991 | Hradisky | D34/8 |
| D. 322,350 | 12/1991 | Craft, Jr. et al. | D34/9 |
| D. 324,122 | 2/1992 | Brüssing | D34/10 |
| D. 326,343 | 5/1992 | Hradisky | D34/7 |
| D. 326,754 | 6/1992 | Hradisky | D34/7 |
| D. 327,349 | 6/1992 | Juergens | D34/11 |
| D. 327,555 | 6/1992 | Juergens | D34/1 |
| D. 328,170 | 7/1992 | Juergens | D34/11 |

(List continued on next page.)

OTHER PUBLICATIONS

Pp. 2 and 6, Internal surface of a container; Continental Manufacturing Company, 123 Byassee Dr., Hazelwood, Missouri 63042. Publication date Oct. 1994.

Catalog Page, Internal surface of a container; hammerlit GmbH, 2762 Leer, Postfach 1228. Publication date Oct. 1995.

Catalog Page, Internal surface of a container; Toter Incorporated, P.O. Box 5338, 841 Meacham Road, Statsville, North Carolina 28677. Publication date Apr. 1992.

Catalog Page, Internal surface of a container; Rubbermaid Incorporated, 1147 Akron Road, Wooster, Ohio 44691. Publication date 1980.

Catalog Page, Internal surface of a container; Rubbermaid Incorporated, 1147 Akron Road, Wooster, Ohio 44691. Publication date 1980.

Catalog Page, Internal surface of a container; Schlosser & Co., GmbH, Industriestr. 22, 8062 Markt Indersdorf. Publication date Dec. 1995.

Catalog Page, Internal surface of a container; Rubbermaid Commercial Products Inc., 3124 Valley Avenue, Winchester, Virginia 22601. Publication date 1992.

*Primary Examiner*—Steven Pollard
*Attorney, Agent, or Firm*—Richard B. O'Planick; Timothy A. Nathan

[57] ABSTRACT

An improved method of blow molding a hollow article is disclosed comprising the adaptation of a die pin (26) to include spaced apart channels (38) therein that extend from top to bottom along the sides of the die pin. The channels create reinforcement ribs (70) along the inside surface (68) of a formed parison (30). The ribs expand with the parison into a final form and serve to reinforce the resultant body while being visible only from the inside. The channels (38) are each bifurcated to provide a segment (44) below a shut-off surface (46) in which plastic exiting the die pin can expand to form ribs (70) of substantial thickness. Portions of the parison sidewalls (66) between the ribs (70) are thinned to reduce part weight and the ribs (70) reinforce the sidewalls to compensate yet, being visible only from the inside, do not detract from the external appearance of the article.

7 Claims, 10 Drawing Sheets

U.S. PATENT DOCUMENTS

| | | | |
|---|---|---|---|
| D. 331,134 | 11/1992 | Hradisky | D34/11 |
| D. 333,369 | 2/1993 | Breen et al. | D34/10 |
| D. 337,187 | 7/1993 | Hampshire | D34/1 |
| D. 337,190 | 7/1993 | Juergens | D34/11 |
| D. 338,757 | 8/1993 | Harrison | D34/7 |
| D. 343,267 | 1/1994 | Craft | D34/11 |
| D. 349,795 | 8/1994 | Schauer et al. | D34/5 |
| D. 351,704 | 10/1994 | Breen | D34/11 |
| D. 351,705 | 10/1994 | Bird et al. | D34/11 |
| D. 351,706 | 10/1994 | Breen | D34/11 |
| D. 355,511 | 2/1995 | Cassel | D34/1 |
| D. 355,514 | 2/1995 | Breen | D34/1 |
| D. 355,739 | 2/1995 | Bird et al. | D34/1 |
| D. 357,779 | 4/1995 | Breen | D34/1 |
| D. 358,918 | 5/1995 | Gale | D34/11 |
| D. 360,724 | 7/1995 | Breen et al. | D34/1 |
| D. 362,525 | 9/1995 | Kruger | D34/1 |
| D. 365,427 | 12/1995 | Brightbill et al. | D34/1 |
| D. 365,901 | 1/1996 | Kowalski et al. | D34/11 |
| D. 370,107 | 5/1996 | Brightbill et al. | D34/11 |
| D. 370,108 | 5/1996 | Brightbill et al. | D34/11 |
| D. 375,604 | 11/1996 | Mitchell | D34/39 |
| D. 376,235 | 12/1996 | Presnell | D34/1 |
| D. 376,456 | 12/1996 | Presnell et al. | D34/1 |
| D. 376,884 | 12/1996 | Presnell et al. | D34/11 |
| D. 377,253 | 1/1997 | Presnell | D34/11 |
| 2,787,397 | 4/1957 | Radford | 220/675 X |
| 3,031,207 | 4/1962 | Bard | 280/460 |
| 3,659,585 | 5/1972 | Bay | 220/675 X |
| 3,759,416 | 9/1973 | Constantine | 220/97 F |
| 3,796,267 | 3/1974 | Hunter et al. | 169/57 |
| 4,195,746 | 4/1980 | Cottrell | 220/675 X |
| 4,450,976 | 5/1984 | Snyder et al. | 220/343 |
| 4,558,799 | 12/1985 | Hammond | 220/343 |
| 4,630,752 | 12/1986 | DeMars | 220/404 |
| 4,709,833 | 12/1987 | Granberg et al. | 220/675 X |
| 4,723,686 | 2/1988 | Pennisi | 220/300 |
| 4,753,367 | 6/1988 | Miller et al. | 220/404 |
| 4,819,827 | 4/1989 | DiSesa | 220/318 |
| 4,907,710 | 3/1990 | Bulkens | 220/1 T |
| 5,031,796 | 7/1991 | Shafer et al. | 220/571 |
| 5,048,977 | 9/1991 | Robbins, III | 220/908 X |
| 5,085,340 | 2/1992 | Doxey et al. | 220/298 |
| 5,088,750 | 2/1992 | Beese et al. | 280/47.26 |
| 5,092,480 | 3/1992 | Waterson | 220/23.4 |
| 5,129,535 | 7/1992 | Hradisky | 220/23.4 |
| 5,183,180 | 2/1993 | Hawkins et al. | 220/908 |

METHOD FOR ADDING STRENGTH TO A CONTAINER

BACKGROUND OF THE INVENTION

1. Field of the Invention

The invention relates generally to plastic blow molded containers such as refuse containers and, more specifically, to methods of reinforcing such articles to achieve enhanced strength characteristics and reduced cost of manufacture.

2. The Prior Art

The blow molding process is commonly used in the production of containers for various applications. For example, many commercially available refuse containers, comprising a lid and a base, are manufactured by such a process. Conventional blow molding apparatus manufacture containers by means of blow molding from tubular preforms or parisons which are extruded of plastic by extruder heads from plastics material which has been plasticized in extruders. The discharge nozzle from which the platicized material exits to create the preform typically includes a die ring having a center aperture and a frustro-conical die pin that is received into the die ring aperture. The spacing between the outer surfaces of the die pin and the outward directed surfaces of the die ring which define the aperture is adjustably controlled by movement of the die pin in and out of the die ring.

From the extruder, plastic is pressured downward between the die pin and the die ring, forming a hollow parison which is suspended between two mold halves. The parison is then expanded outwardly by the injection of air into the center and reforms against the mold sidewalls. The air can be injected from the top through the die pin or, alternatively, from the bottom of the mold cavity. After the plastic sets against the mold sidewalls, the mold is open and the hollow article formed thereby is extracted.

U.S. Pat. Nos. 4,889,477 and 4,297,092, incorporated herein by reference, illustrate the general state of the art apparatus for blow molding hollow objects. The process works well and may be used to form hollow bodies for a variety of applications. For example, Design U.S. Pat. No. 326,342 shows a refuse container that is preferrably formed by a gas-assisted molding technique. The container comprises a lid and a base, both integrally formed from the same parison. Subsequent to the molding operation, the lid and the base are severed into independent components. An advantage to forming articles by this method is that the walls of the container and lid can be thinned to a great degree, thereby conserving plastic and reducing costs. However, in making the walls of thinner stock, the container and base can lose its structural rigidity and integrity. The resultant product, while functional for its intended purpose, can be perceived as being structurally inferior to containers formed by other means.

To compensate for reduced rigidity resulting from thinning the wall stock, designers of containers have incorporated shoulders and recesses into the external wall surface. These structural elements are effective in increasing the hoop strength and rigidity of the containers. However, forming shoulders and recesses into the sidewalls can detract from the aesthetic appeal of the exterior of the container and limits design alternatives.

SUMMARY OF THE INVENTION

The subject invention overcomes the aforementioned deficiencies in state of the art blow molding techniques and containers made thereby. The die pin in the parison forming ejector is adapted to have spaced apart channels extending along outward surfaces, aligned in the direction of plastic material flow. Each channel tapers upward at a lower end to a cutoff surface and includes a channel segment at the opposite side of the cut-off surface at the lower end of the die pin. The lower portions of the channels allow space for the material to expand once it leaves the die pin, allowing for the formation of thicker ribs than otherwise possible.

The formation of the parison proceeds as described above, with molten plastic pressurized over the die pin outward surfaces to exit in the form of the hollow parison. The channels within the die pin outward surfaces forms ribs extending internally along the parison from a top end to a bottom end. Subsequent expansion of the parison outward against the mold accordingly creates a part that has ribs extending internally therealong from top to bottom. These ribs are of greater sectional thickness than connective wall stock therebetween, and give enhanced rigidity to the molded part.

In the preferred embodiment, the molded part is a container that includes integrally formed lid and base components. The ribs extend along the inward surfaces of the lid and base and are apparent only from the inside. The ribs are of greater sectional thickness than the nominal stock thickness in a conventional container, but the connective wall stock therebetween can be made to be of substantially thinner stock. The result is a net reduction in plastic weight in the part, yet a part that has greater hoop strength and rigidity than a conventionally formed container. Finally, the container and lid can have any external appearance desired since the ribs are only visible from inside. Thus, the aforementioned constraints on design due to strength considerations have been eliminated.

Accordingly, it is an objective of the present invention to provide an improved method for producing, by blow molding, a product having a reduced part weight yet increased structural rigidity and strength.

Another objective is to provide a reinforced molded container and method of manufacture thereof in which the means of reinforcement are not externally visible.

Yet a further objective is to provide a base receptacle and lid integrally formed from a common parison and having common strength reinforcing means.

An objective of the invention is to provide an improved method for producing and, by a blow molding process, a reinforced container that has reduced part weight, reduced material consumption, and increased strength.

A further objective is to provide an improved method for producing a reinforced container by a blow molding process that is no less efficient than state of the art methods.

Another objective is to provide improved blow molding apparatus that is inexpensive to manufacture and can be easily and readily retrofitted to existing equipment.

Still another objective is to provide an improved die pin configuration capable of forming relatively thick ribs along the inside surface of a hollow parison.

These and other objectives, which will be apparent to those skilled in the art, are achieved by a preferred embodiment that is described in detail below and illustrated in the accompanying drawings.

DESCRIPTION OF THE ACCOMPANYING DRAWINGS

DESCRIPTION OF THE PREFERRED EMBODIMENT

Figure 1:
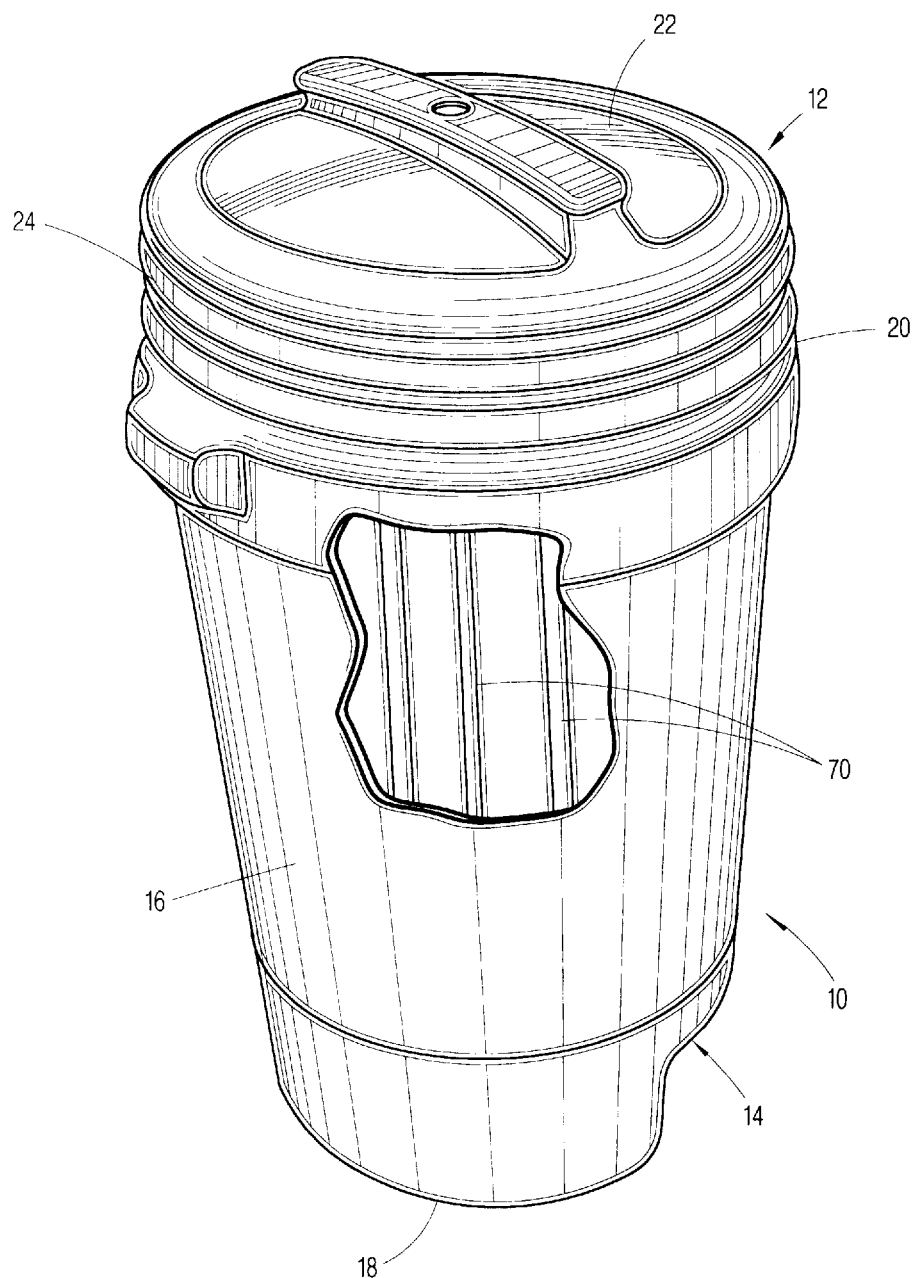
FIG. 1 is a perspective view of a refuse container produced pursuant to the subject invention.

Referring initially to FIGS. 1, the subject invention will be described in the context of forming a refuse container 10 for illustrative purposes. However, the teachings have application in the manufacture of other hollow objects and products if so desired. The container 10 is seen to comprise a lid 12 and a container base 14. The base 14 is of cylindrical general shape, having elongate sidewalls 16 extending between a bottom surface 18 and an upper rim 20. The lid 12 is shown to have a downwardly concave top wall 22 and a dependent peripheral skirt 24.

Figure 2:
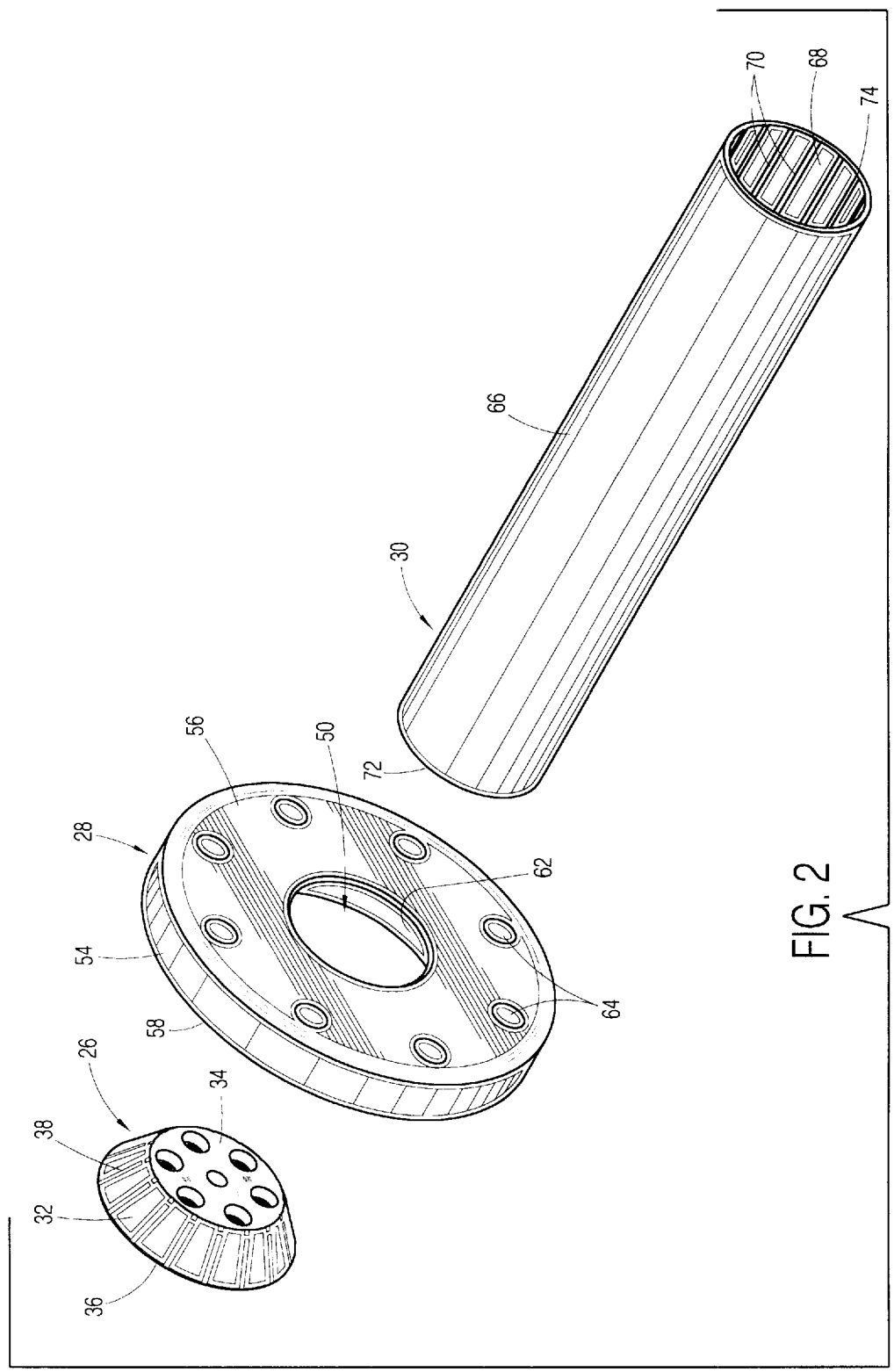
FIG. 2 is an exploded perspective view of a die pin, die ring, and parison formed thereby pursuant to the invention.
Figure 4:
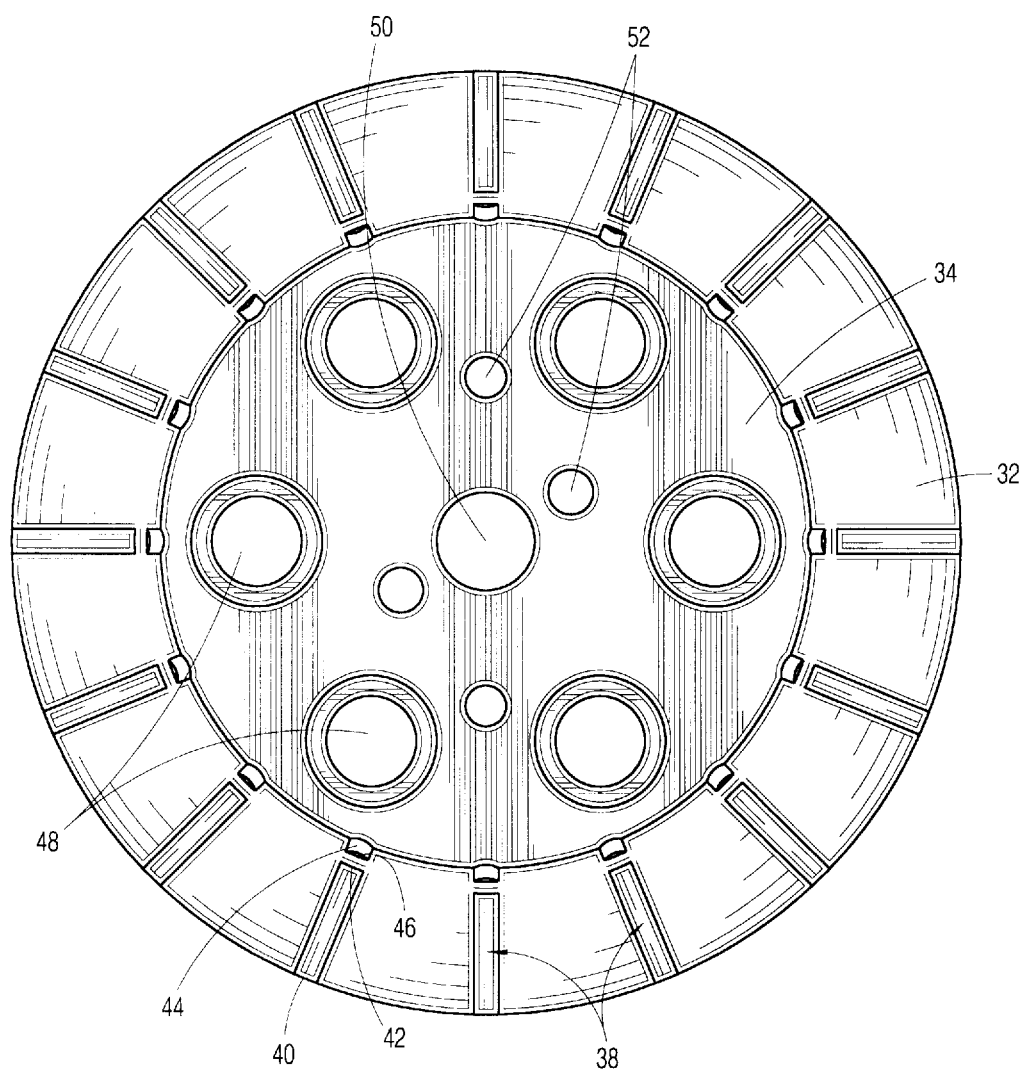
FIG. 4 is a bottom plan view of the die pin.

With reference to FIGS. 2 and 4, the discharge nozzle incorporating the subject invention comprises a die pin 26 and a die ring 28. Typical to common blow molding machines, the die ring is mounted to an extruder head (not shown) and remains stationary. The apparatus is used to form an elongate tubular preform or parison 30. The parison 30 is expanded by air outward into its intended shape as will be explained below.

The die pin 26 is of frustro-conical configuration, having sidewalls 32 which taper inwardly from top to a circular bottom surface 34; and a circular top surface 36. A series of spaced apart elongate channels 38 are formed to extend into the sidewalls 32 from a top channel end 40 at the top surface 36 to a bottom channel end 42 positioned a distance above the bottom surface 38. The lower end of the channels 42 tapers upwardly to an annular portion 46 of the sidewalls 32 that constitutes a shut-off surface, and each channel has a lower segment 44 below the shut-off surface 46 that extends to the bottom surface 38 of the die pin 26.

Six peripherally spaced-apart bolt bores 48 project into the bottom surface 38 of the die pin 26 to the top surface 36, and a center bore 50 extends along the major axis of the die pin 26. Four set-screw access bores extend through the die pin 26 and surround the center bore 50 as shown in FIG. 4. The die pin is machined from steel and is configured for attachment to a hydraulic piston (not shown) on the extruder head that moves the die pin axially in a reciprocating manner. The configuraton of the die pin 26, except for the bifurcated channels 42, and its operation in conjunction with the die ring is conventional and known to those skilled in the art of blow molding apparatus.

Figure 3:
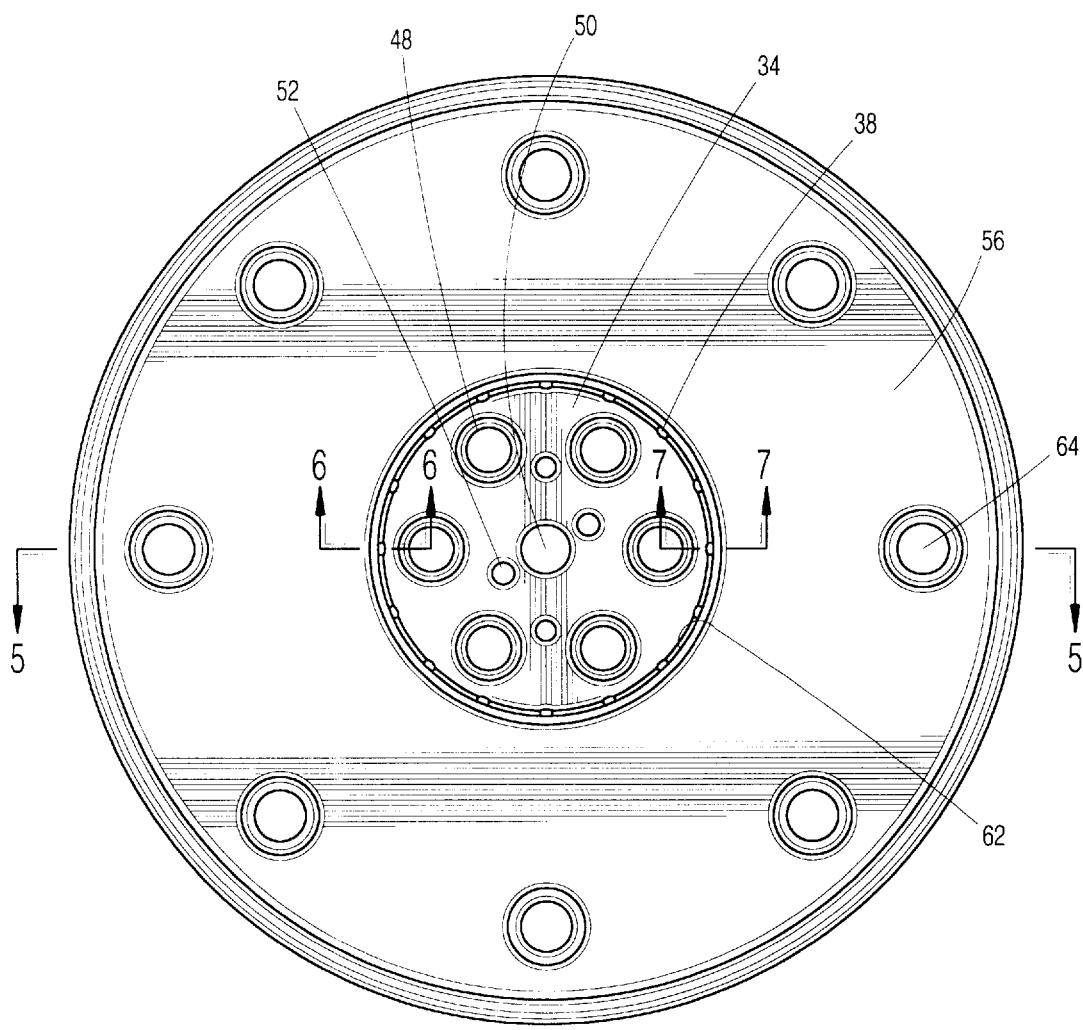
FIG. 3 is a top plan view of the assembled die pin and die ring.

Referring next to FIGS. 2 and 3, the die ring 28 has a general doughnut shape, defined by cylindrical sidewalls 54 that extend from a bottom surface 56 to a top surface 58. A center bore 60 extends through the ring 28, defined by bore sidewalls 62 which taper inwardly from top to bottom to complement the taper of the die pin surfaces 32. Eight peripherally spaced-apart bolt holes 64 extend through the die ring 28 by which the die ring is bolted to the extruder head and rendered stationary. The representative parison 30 is of tubular configuration, having outward sides 66 and an inward surface 68. Spaced apart ribs 70 extend from the inward surface 68 into the parison bore from a top parison end 72 to a bottom parison end 74. The parison 30 is open-ended at the top and bottom.

As illustrated in FIGS. 2, 3, 6, and 7, the die pin 26 is adapted to seat within the die ring 28, with sidewalls 32 of the pin 26 in close proximity to the sidewalls 54 of the die ring 28. An annular orifice is created between the die pin and the die ring by the gap therebetween, preferably 0.045 to 0.100 thousandths of an inch, depending on the item that is being molded. The die ring 28 is fixedly bolted to the extruder head (not shown) in conventional fashion, and the die pin 26 is mounted to a reciprocating hydraulic piston (not shown) in conventional manner so as to axially move within the die ring 28 between an upward, open position represented in FIG. 6 and a downward, closed position represented in FIG. 7. The frustro-conically shaped die pin 26 and the ring 28 have matingly sloped adjacent walls that diverge from each other in the open position to form an annular orifice surrounding the die pin 26.

Figure 6:
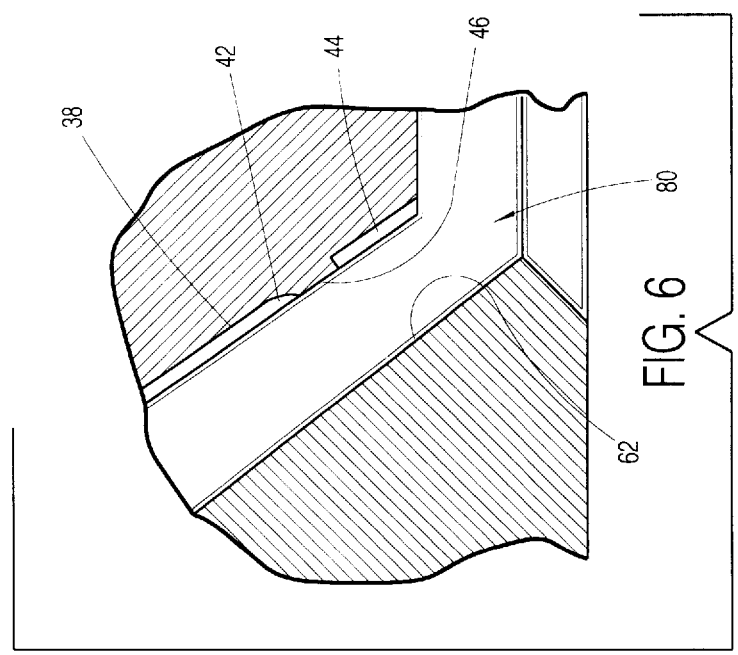
FIG. 6 is an enlarged section view through the assembled die pin and die ring in the open configuration, taken along the line 6—6 of FIG. 3.
Figure 8:
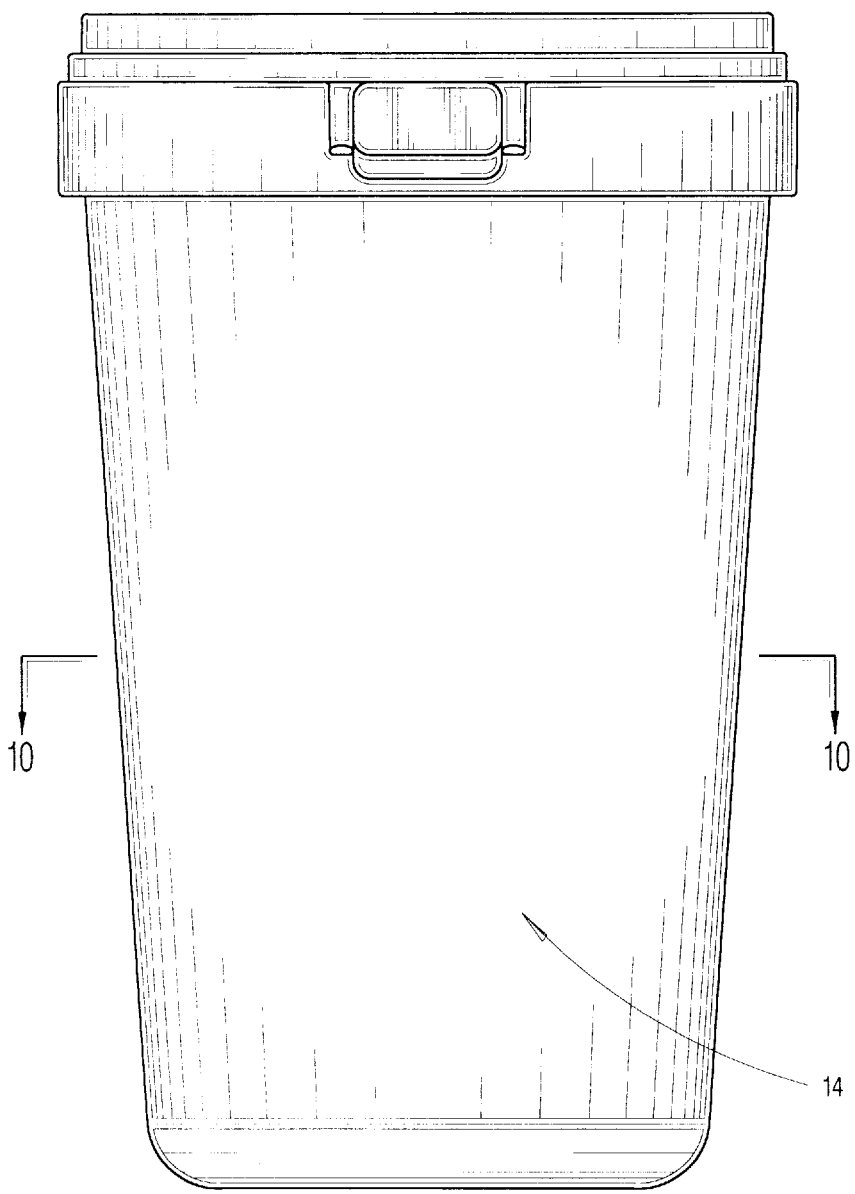
FIG. 8 is a side elevational view of the refuse container base.
Figure 9:
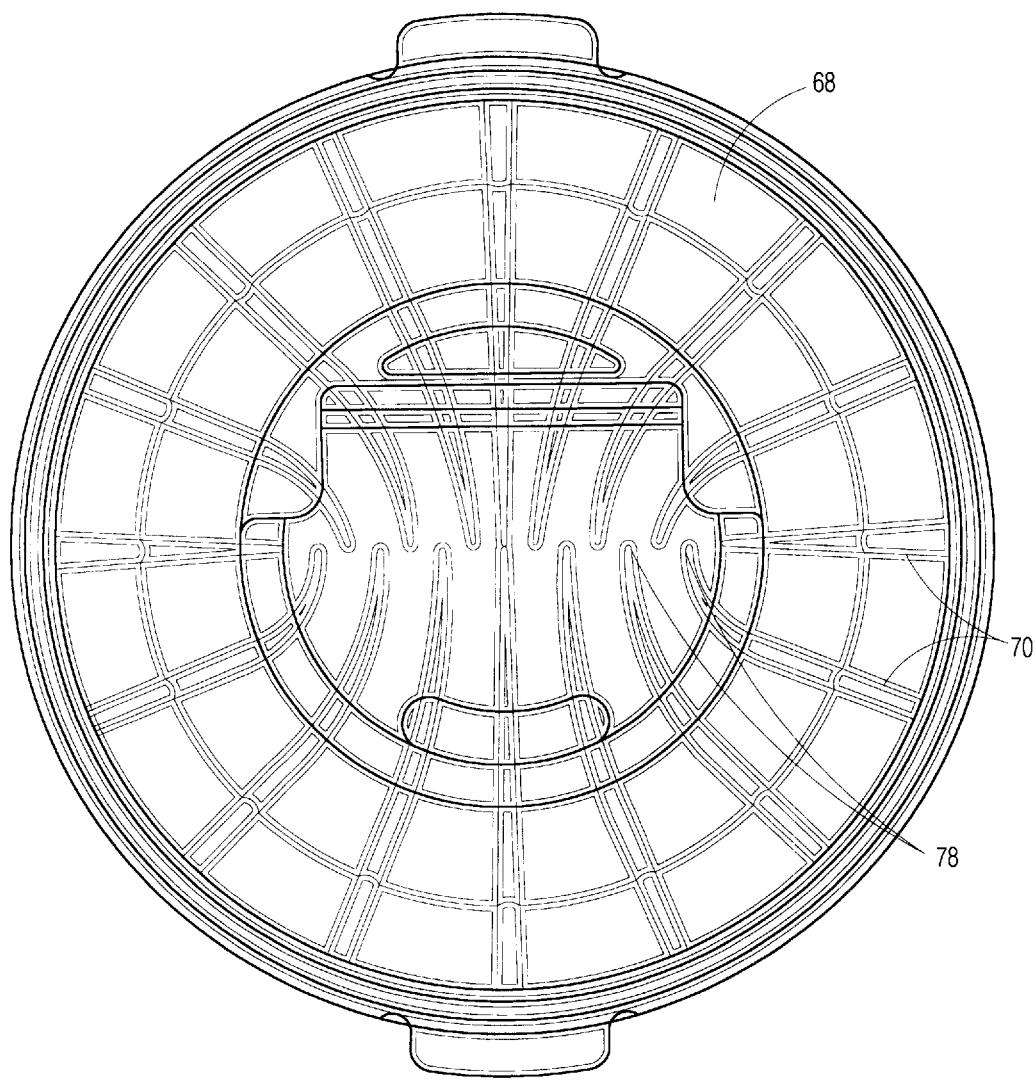
FIG. 9 is a top plan view thereof.
Figure 10:
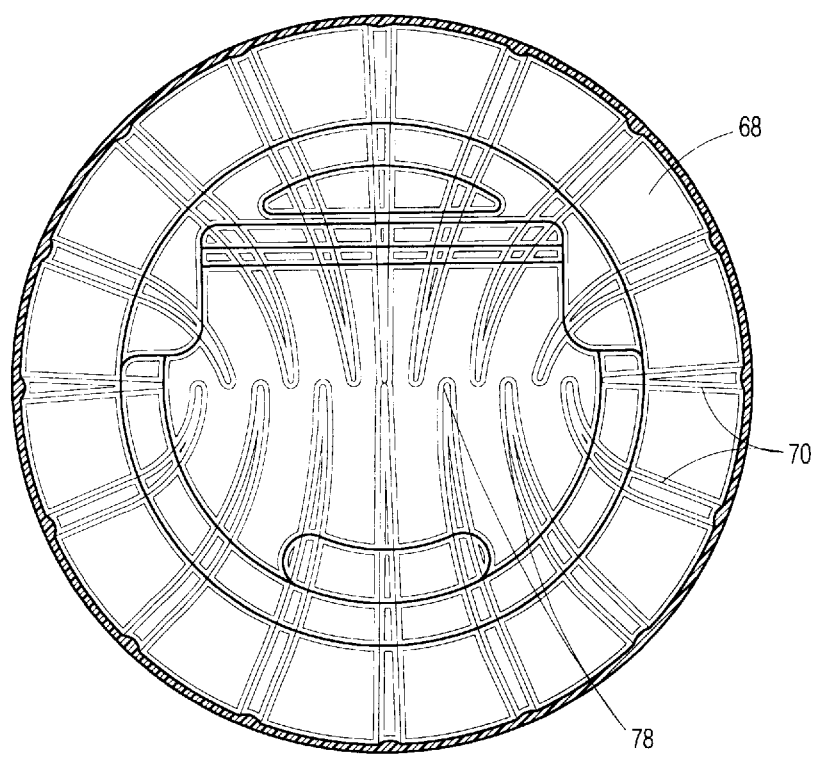
FIG. 10 is a cross-section view thereof, taken along the line 10—10 of FIG. 8.
Figure 11:
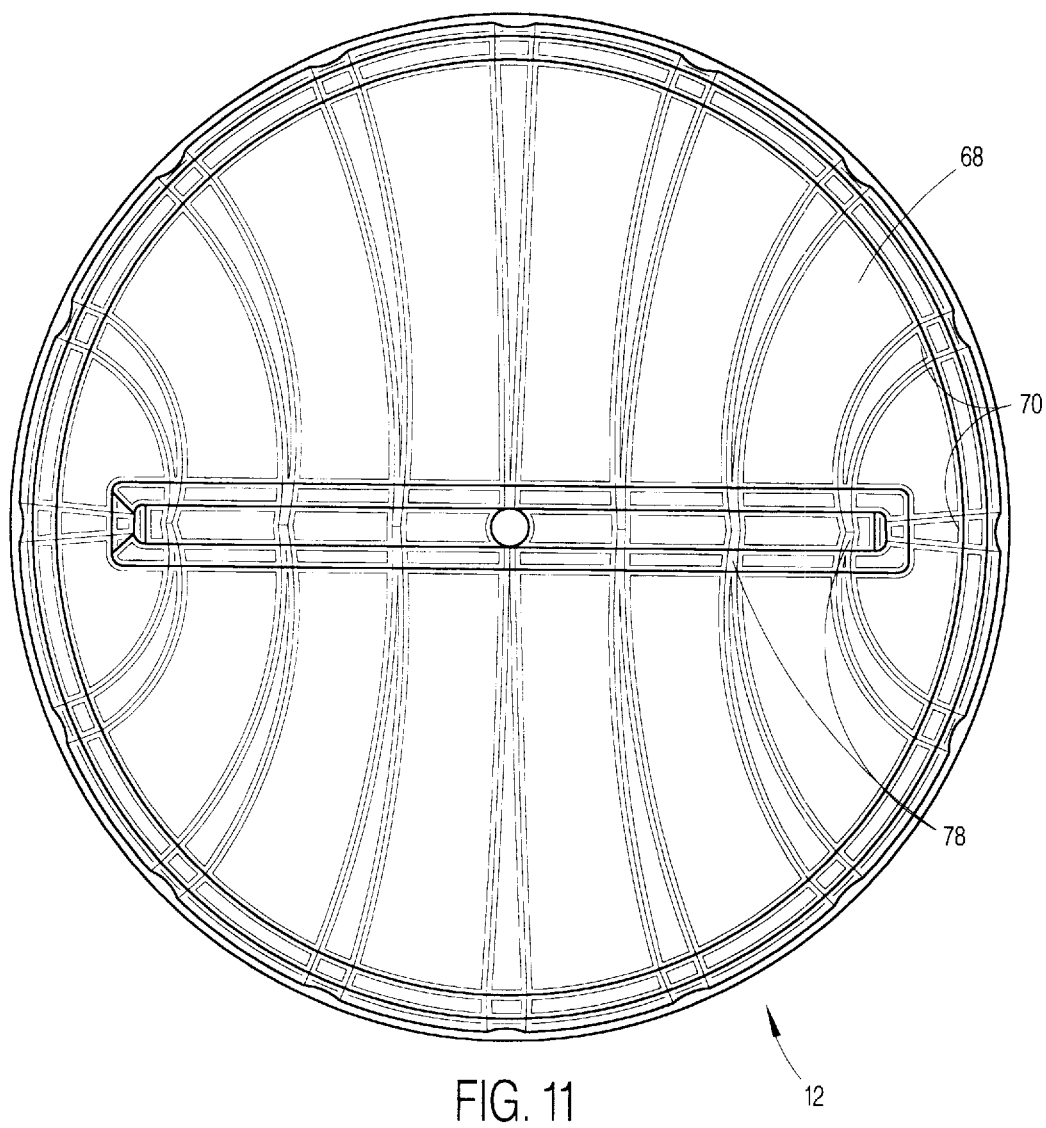
FIG. 11 is a bottom plan view of the refuse container lid.

FIG. 6 illustrates the die pin in the open condition, with an annular orifice 80 formed between the pin and die ring. After formation of the parison, the die pin is hydraulically lowered to the position in FIG. 7 until the shut-off surface 46 contacts the sidewalls 62 of the die ring and shuts off the orifice 80. To initiate the cycle again, the die pin is hydraulically raised and the flow of plastic re-commences to form a new parison. It should be noted that in the closed, shut-off position of FIG. 7, that channel segments 44 lie below the shut-off surface 46 and below the lower edge of the die ring. The segments 44 allow for the expansion of plastic into rib formation as will be explained below.

Figure 5:
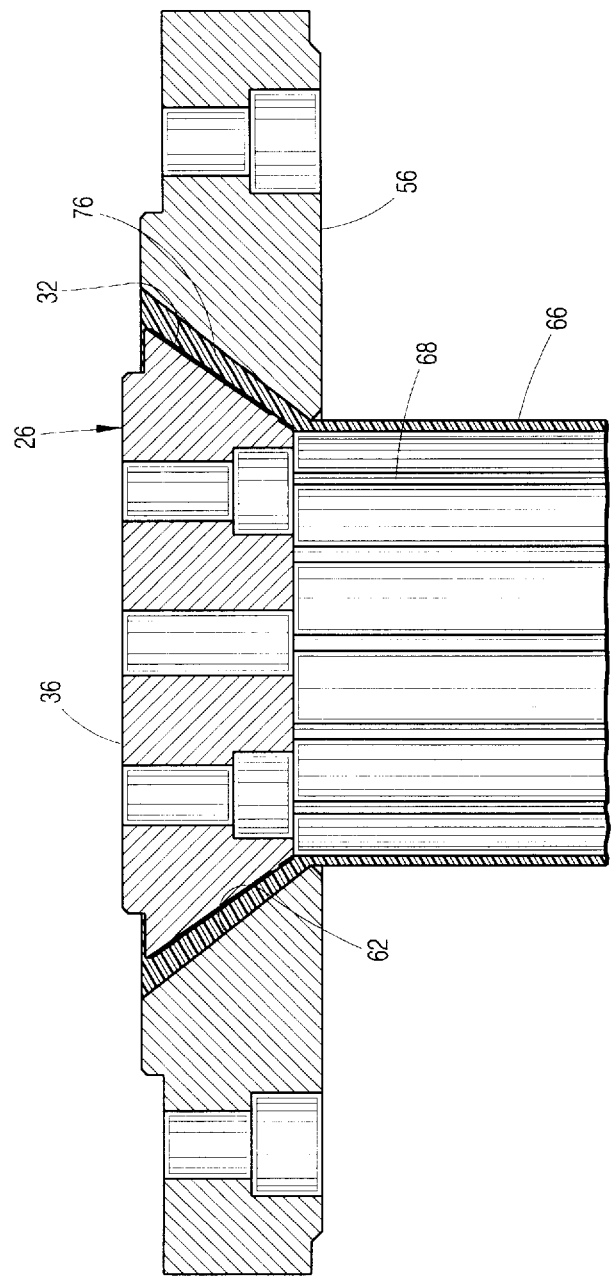
FIG. 5 is a transverse section view through the assembled die pin and die ring, taken along the line 5—5 of FIG. 3.
Figure 7:
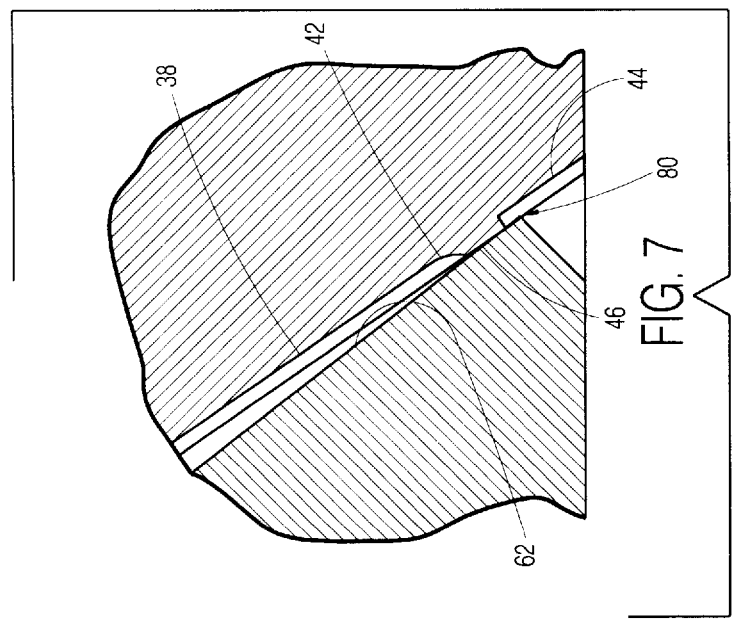
FIG. 7 is an enlarged section view through the assembled die pin and die ring in the closed configuration, taken along the line 7—7 of FIG. 3.

FIG. 5 illustrates the injection of molten plastic 76 through the orifice defined between the die pin 26 and the die ring 28, and out of the bottom of the die pin to form the parison 30. The channels 38 are bifurcated into an upper portion above the shut-off surface 46 and a smaller lower segment 44 below surface 46. As the plastic flows over the die pin, it fills the orifice 80 and emerges from the bottom under pressure. The channel segments 44 below the shut-off surface 46 create ribs 70 along the inward parison surface 68 from top to bottom; each rib extending parallel and spaced apart from ribs on either side thereof.

The plastic expands under pressure into the channel segments 44 as it exits from the bottom of die pin 26, creating a thicker rib than that created at the upper channel portions. Were a continuous uninterrupted channel and placing the shut-off surface at the extreme bottom of the die pin, the thickness of the rib would be on the order of 0.060 inches. However, by bifurcating each channel and providing channel segments 44 below the shutoff surface for expansion of the plastic as it exits the die pin, it has been found that the thickness of the ribs can be increased by 0.020 inches, creating ribs having a total thickness of 0.080 inches. The thicker the ribs, the more strength they will add to the resulting hollow article wall stock.

The parison sidewall thickness is controlled by the orifice width between the die pin and die ring, and is preferably controlled to be 0.070 inches between the ribs. Conventionally blow molded containers typically have a nominal wall thickness of 0.060 to 0.080 inches. Thus, it will be understood that while the (relatively wide) connective wall segments between the ribs of the subject container are of thinner stock than conventional containers, the (relatively narrow) ribs are substantially greater in sectional dimension than conventional containers. The net result is a 10 percent savings in material usage.

Pursuant to conventional blow molding processes, the parison 30 is formed between an open mold that is closed simultaneous with die pin action. The die pin is placed into the down, or closed, position, blocking further plastic from flowing. Air is then injected into either the top or bottom ends of the parison, or both, causing the parison to expand outwardly against the mold surfaces. The expansion of the parison causes an expansion of the ribs 70 and thins the wall stock thickness. After the plastic cures, the mold is opened and the part is ejected.

The lid 12 and base 14 components of the subject refuse container are formed from the same parison. After the parison expands, cures, and the part is ejected, the part is separated into the lid and base components. FIGS. 1, 9, 10, and 11 illustrate the appearance of the components 12,14 subsequent to their separation. It will be noted that the ribs 70 have expanded into a diverging formation from the ends of the original parison.

Also, the ribs 70 are visible only from the interior of the container and lid and cannot be seen from outside of the components. This affords the designer of products with the capability of designing the exterior of the container into any desired form and placing the reinforcement ribs along the interior, unseen, portion of the article. The result is an unparalleled flexibility in the design of blow molded articles.

It should be noted that the subject channeled die pin may be retrofitted to existing state of the art blow molding equipment without requiring expensive alterations. Since the die pin does not affect the operation of the equipment, no expensive changes need be made to the extruders or the extruder head. Incorporation of the subject invention into conventional apparatus is thus easily and inexpensively accomplished.

The thick ribs along the interior of the lid and base components give rigidity and strength to the article. Thus, while the connective portions of the side walls of the present invention are thinner than in comparable blow molded containers, the presence of the ribs make the containers of the subject invention feel more rigid and substantial. The ten percent reduction in part weight that the ribs and thinned connective wall stock gives is, therefore, accomplish without sacrificing strength or aesthetic feel. To the contrary, the container is stronger and has a more rigid and substantial feel due to the presence of the reinforcement ribs.

Finally, it will be appreciated that the use of the subject invention does not affect the cycle time of the blow molding process or add any inefficiency to that process. The formation of ribs is accomplished by channels in the die pin without affecting other elements of the apparatus or the process. The added cost of producing channelled die pins is not substantial and is far less than the savings achieved by the practice of the invention.

While the above describes the preferred embodiment of the invention and is particularly related to refuse containers, the subject invention is not intended to be so limited. Any blow molded article can be improved by the application of the subject principles. Other embodiments or applications of the teachings of the subject invention, which will be apparent to those skilled in the art, are intended to be within the scope and spirit of the invention.

I claim:

1. A molded hollow container comprising:
    a concave bottom panel and side panels that extend from the bottom panel to an upper rim and define an internal chamber therebetween;
    spaced apart and inwardly directed reinforcement ribs integrally formed with and projecting from inward surfaces of the bottom and side panels into the chamber,
    the ribs extend continuously downward from upper ends along the inward surfaces of the side panels and continuously converge in spaced apart relationship therefrom along the inward concave surface of the bottom panel to terminal rib ends, the terminal rib ends being located proximate each other at a central region of the bottom panel, and the ribs having a relatively thick cross-sectional dimension from the upper ends to the terminal ends thereof; and
    the bottom panel and side panels have connective portions between the rib of relatively reduced cross-sectional dimension and of substantially constant thickness downward along the side panels and across the concave bottom panel.

2. A container according to claim 1, wherein the ribs extend longitudinally along the inward surfaces of the side panels from the upper rim downward and across the bottom panel.

3. A container according to claim 2, wherein the ribs of the container are visible only to the inside of the side and bottom panels.

4. A container according to claim 3, wherein further comprising a lid component formed to have a top panel and a dependent skirt portion that extends downward from the top panel to a lower terminal edge, the lid fits over the upper rim of the container and encloses the chamber; and
    spaced apart and inwardly directed reinforcement ribs integrally formed with and projecting from inward surfaces of the top panel and skirt portion, and the ribs have a relatively thick cross-sectional dimension; and
    the lid top panel and skirt portions have connective portions between the ribs of relatively reduced cross-sectional dimension.

5. A container according to claim 4, wherein the ribs extend across the top panel and downwardly along the inward surface of the skirt portion to the lower terminal edge.

6. A container according to claim 5, wherein the ribs of the lid are visible only to the inside of the top panel and the skirt panels.

7. A container according to claim 6, wherein the lid and container are unitarily molded of plastics material in adjacent relationship from a single parison form, wherein the ribs of each of the lid and the container are formed as continuous extensions of the ribs of the other.

* * * * *